(12) United States Patent
Ichikawa et al.

(10) Patent No.: US 7,618,596 B2
(45) Date of Patent: Nov. 17, 2009

(54) HONEYCOMB FILTER AND EXHAUST GAS PURIFICATION SYSTEM

(75) Inventors: Yukihito Ichikawa, Nagoya (JP); Toshio Yamada, Nagoya (JP)

(73) Assignee: NGK Insulators, Nagoya (JP)

( * ) Notice: Subject to any disclaimer, the term of this patent is extended or adjusted under 35 U.S.C. 154(b) by 519 days.

(21) Appl. No.: 10/778,051

(22) Filed: Feb. 17, 2004

(65) Prior Publication Data

US 2004/0161373 A1   Aug. 19, 2004

(30) Foreign Application Priority Data

Feb. 18, 2003  (JP)  ............... 2003-039426

(51) Int. Cl.
*B01D 50/00*   (2006.01)
*B01D 39/06*   (2006.01)

(52) U.S. Cl. ......................... 422/180; 55/523

(58) Field of Classification Search ............. 422/171, 422/177, 180; 55/523
See application file for complete search history.

(56) References Cited

U.S. PATENT DOCUMENTS

| 4,416,676 | A | * | 11/1983 | Montierth | ............ 55/523 |
| 4,417,908 | A | | 11/1983 | Pitcher, Jr. | |
| 4,519,820 | A | | 5/1985 | Oyobe et al. | |
| 6,797,666 | B2 | | 9/2004 | Harada et al. | |
| 2004/0052699 | A1 | * | 3/2004 | Molinier et al. | ............ 422/180 |

FOREIGN PATENT DOCUMENTS

| EP | 0 225 402 A1 | 6/1987 |
| EP | 0 766 993 A2 | 4/1997 |
| EP | 1 217 185 A2 | 6/2002 |
| EP | 1 231 363 A2 | 8/2002 |
| EP | 1 245 801 A2 | 10/2002 |
| EP | 1 256 369 A2 | 11/2002 |
| EP | 1 375 849 A2 | 1/2004 |
| EP | 1 398 069 A2 | 3/2004 |
| JP | A-58-196820 | 11/1983 |
| JP | A-05-068828 | 3/1993 |
| JP | U-H06-47619 | 6/1994 |
| JP | A 10-99626 | 4/1998 |
| JP | A-2001-205108 | 7/2001 |
| JP | A 2001-269585 | 10/2001 |
| JP | 2001334114 A | * 12/2001 |

(Continued)

*Primary Examiner*—Tom Duong
(74) *Attorney, Agent, or Firm*—Oliff & Berridge, PLC

(57) ABSTRACT

A honeycomb filter is provided comprising a honeycomb structure having a large number of through channels formed in an axial direction and partitioned by porous partition walls, each of the through channels having a first end at one end of the filter and a second end at an opposite end of the filter, wherein a first group of the through channels are plugged only at the first end, and a second group of the through channels are not plugged. A honeycomb structure is further provided having through channels with a relatively large frontal area and through channels with a relatively small frontal area, and wherein all the through channels with a relatively large frontal area are the first group, and all the through channels with a relatively small frontal area are in the second group. A honeycomb filter is also provided with a catalyst component carried on a surface of the partition walls and/or a surface of pores present in an inside of the partition walls.

3 Claims, 7 Drawing Sheets

FOREIGN PATENT DOCUMENTS

| | | |
|---|---|---|
| JP | A-2002-004844 | 1/2002 |
| JP | A-2002-537965 | 11/2002 |
| JP | A-2003-001067 | 1/2003 |
| JP | A-2003-035126 | 2/2003 |
| JP | A-2004-108331 | 4/2004 |
| WO | WO 00-50745 | 8/2000 |
| WO | WO 02/070106 A1 | 9/2002 |

\* cited by examiner

HONEYCOMB FILTER AND EXHAUST GAS PURIFICATION SYSTEM

FIELD OF THE INVENTION AND THE RELATED ART STATEMENT

The present invention relates to a honeycomb filter used to collect particulate matters in exhaust gas discharged from combustion engines such as a diesel engine.

A large amount of particulate matters (fine particulate substances) including soot (a black smoke of carbon) as a major component are contained in exhaust gas discharged from a diesel engine, gasoline lean burn engine, or gasoline direct-injection engine. Since particulate matters cause environmental pollution if emitted into the atmosphere, a filter to collect the particulate matters is mounted in the exhaust gas system for a diesel engine.

The honeycomb filter used for such a purpose has a honeycomb structure having many through channels 13 partitioned by porous partition walls 12 running in the axial direction as shown in FIGS. 10(a) and 10(b). One end of a part of the through channels 13a are plugged on one end face 16 and one end of the remaining through channels 13b are plugged on the other end face 15 (See JP-A-2001-269585).

Gas to be treated (exhaust gas) flows into through channels 13a of which the end face 15 on the inlet port side is not plugged, but the end face 16 on the outlet port side is plugged, passes through the porous partition walls 12, moves to through channels 13b of which the end face 15 on the inlet port side is plugged, but the end face 16 on the outlet port side is not plugged, and discharged from the through channels 13b. In this instance, the partition walls 12 serve as filter layers. Particulate matters such as soot in the gas are caught by the partition walls 12 and accumulate on the partition walls 12.

However, the honeycomb filters of the above configuration have a problem of a high-pressure loss since all through channels are plugged on one end face.

A diesel particulate filter (DPF) used for purifying exhaust gas from diesel engines has particulate matters gradually accumulated in the filter as the use of the filter progresses. If left as is, the filter performance degrades. Therefore, when the particulate matters accumulate to some extent, the filter is heated to remove the deposited particulate matters by burning, thereby recovering the filter performance. However, in a conventional honeycomb filter, solids such as ash and iron oxide which cannot be removed by combustion are gradually accumulated and clog the filter.

Furthermore, when the exhaust gas from an engine greatly pulsates, the pulsation is received by all the through channels of which one end is plugged. Therefore, all particulate matters deposited in the through channels (including inside of pores of the partition walls partitioning the through channels) may be discharged behind the filter by exhaust-gas pulsation.

Moreover, conventional honeycomb filters have a configuration in which the through channels are plugged not only on the end face on the outlet port side of exhaust gas, but also on the end face on the inlet port side which is directly exposed to the exhaust gas. Therefore, such conventional honeycomb filters have a problem in thermal shock resistance due to heat expansion and the like of the plugging portions on the end face on the inlet port side. For this reason, it has been difficult to use such filters for purifying exhaust gas from gasoline engines discharging exhaust gas at a temperature higher than that of diesel engines in a temperature fluctuation range greater than that of diesel engines.

In addition, particulate matters adhere to the plugging portions of through channels on the end face on the exhaust gas inlet port side of the honeycomb filters and deposit around the adhered particulate matters as a core, causing even the openings of the through channels of which the end face is not plugged on the exhaust gas inlet port side to clog. This causes another problem of rapidly increasing a pressure loss in the filter.

The present invention has been completed in view of such problems of the prior art. Thus, according to the present invention, there is provided a honeycomb filter capable of using for exhaust gas purification, (1) to reduce a pressure loss, (2) to prevent clogging of the filter with solids that cannot be extinguished by combustion of ash, iron oxide, or the like, (3) to control the phenomenon in which particulate matters deposited in the through channels of the filter are discharged to the filter due to pulsation when the exhaust gas from the engine greatly pulsates, (4) to make it possible to use the filter as an exhaust gas purification filter for gasoline engines of which the exhaust gas temperature is higher than that of diesel engines and fluctuates within a fluctuation range wider than that of diesel engines, and (5) to avoid a rapid increase in the pressure loss in the filter due to clogging of openings of through channels on the end face on the exhaust gas inlet port side with deposited particulate matters.

SUMMARY OF THE INVENTION

The present invention provides a honeycomb filter comprising a honeycomb structure having a large number of through channels formed in the axial direction and partitioned by porous partition walls, wherein specified through channels are plugged at one end face at same side out of two end faces (first invention).

The present invention further provides an exhaust gas purification system, characterized in that the honeycomb filter of the first invention is used as a filter element of said system (the second invention).

The present invention further provides a honeycomb filter comprising a first honeycomb filter which comprises a honeycomb structure having a large number of through channels formed in the axial direction and partitioned by porous partition walls, wherein only a part of large number of through channels is plugged at one end face at same side out of two end faces, and a second honeycomb filter which comprises a honeycomb structure having a large number of through channels formed in the axial direction and partitioned by porous partition walls, wherein a part of large number of through channels is plugged at one end face at same side out of two end faces and remaining through channels are plugged at other end face out of two end faces; the first and second honeycomb filters being in contact or joined with each other in respective plugging portions of through channels (third invention).

The present invention further provides a method for manufacturing the honeycomb filter of the third invention, which includes a step of forming plugging portions of through channels of a first honeycomb filter and a second honeycomb filter by filling one end of through channels with a ceramic material and firing a resultant plugged with the ceramic material, wherein, prior to firing, the first and second honeycomb filters are joined each other and thus joined two honeycomb filters are integrated by firing. (fourth invention).

The present invention still further provides a method for manufacturing the honeycomb filter of the third invention which includes a step of forming plugging portions of through channels of a first honeycomb filter and a second honeycomb filter by filling one end of through channels with a ceramic material and firing a resultant plugged with the ceramic material, wherein, prior to firing, the first and second honeycomb filters are joined each other and thus joined two honeycomb filters are integrated by firing. (fifth invention).

DETAILED DESCRIPTION OF THE EMBODIMENT

Figure 1A:
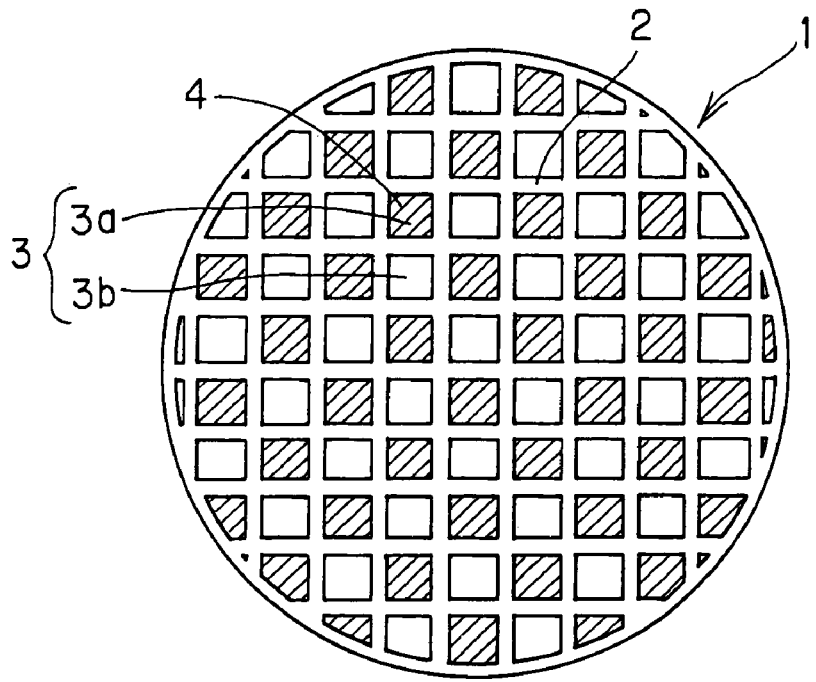
FIGS. 1(a) and (b) are an illustrative showing of one embodiment of the honeycomb structure of the first invention, wherein (a) is a plan view from one end face and (b) is a cross-sectional view.
Figure 1B:
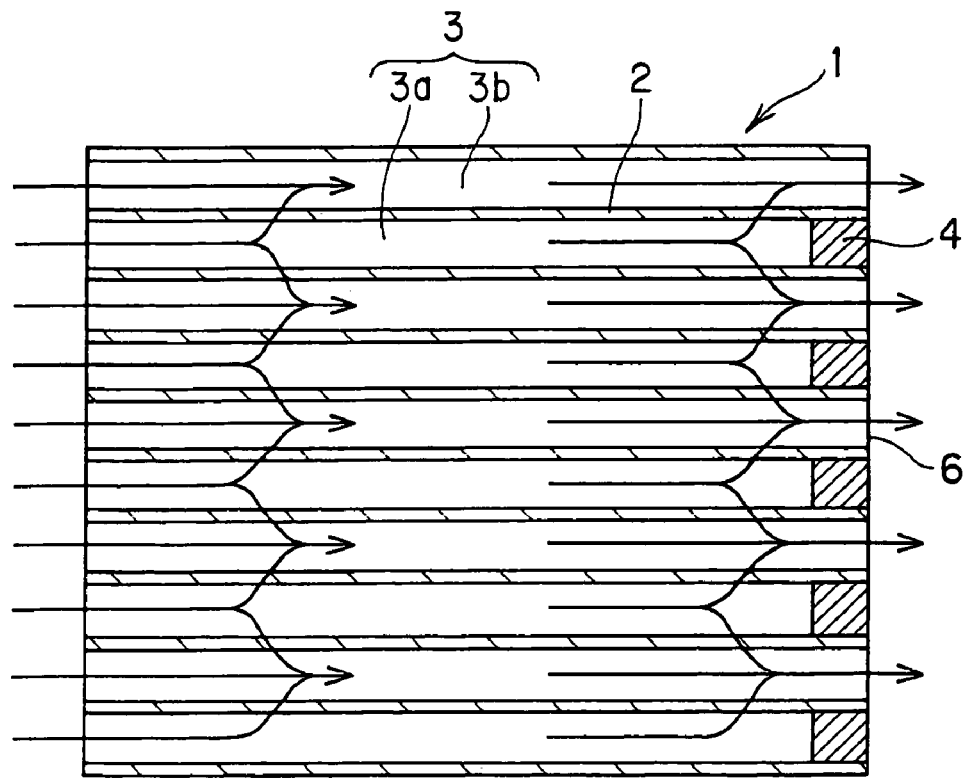

FIG. 1 is a general illustration diagram of one embodiment of the honeycomb filter of the first invention, wherein (a) is a plan view from one end and (b) is a cross-sectional view. The honeycomb filter of the first invention comprises a honeycomb structure having a large number of through channels 3 formed in the axial direction and partitioned by porous partition walls 2, wherein a part of large number of the through channels 3a is plugged only at one end face at the same side out of the two end faces. As an example of the honeycomb structure which can be suitably used for this honeycomb filter, a honeycomb structure made of cordierite having an external diameter of 190.5 mm and a length of 203.2 mm, through channels with a square cross-sectional form (cell form), a cell pitch of 1.6 mm, and a partition wall thickness of 0.3 mm manufactured by extrusion molding can be given.

Figure 10A:
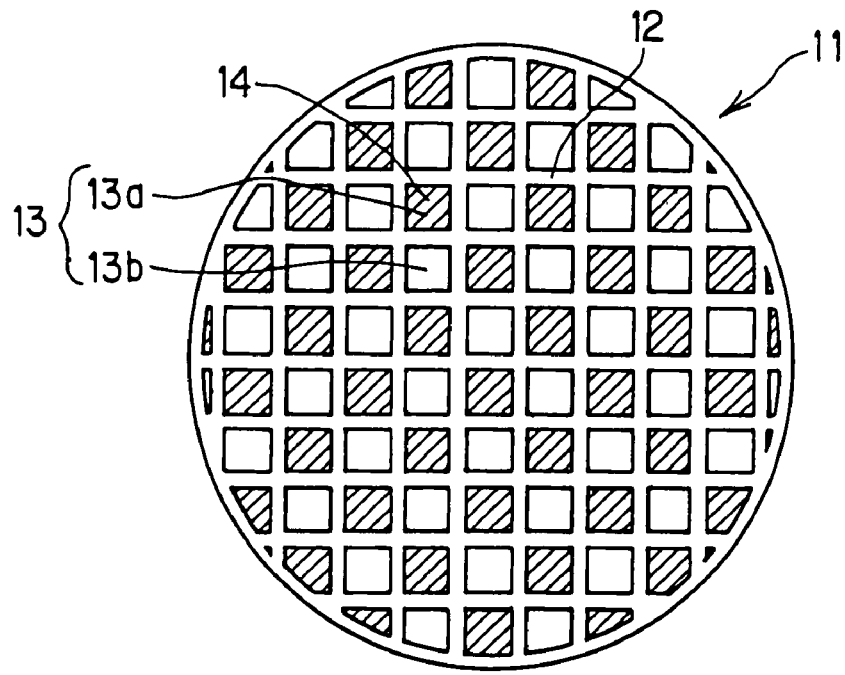
FIGS. 10(a) and (b) are an illustrative showing of a basic configuration of the honeycomb filter conventionally used for DPF and the like, wherein (a) is a plan view from one end face and (b) is a cross-sectional view.
Figure 10B:
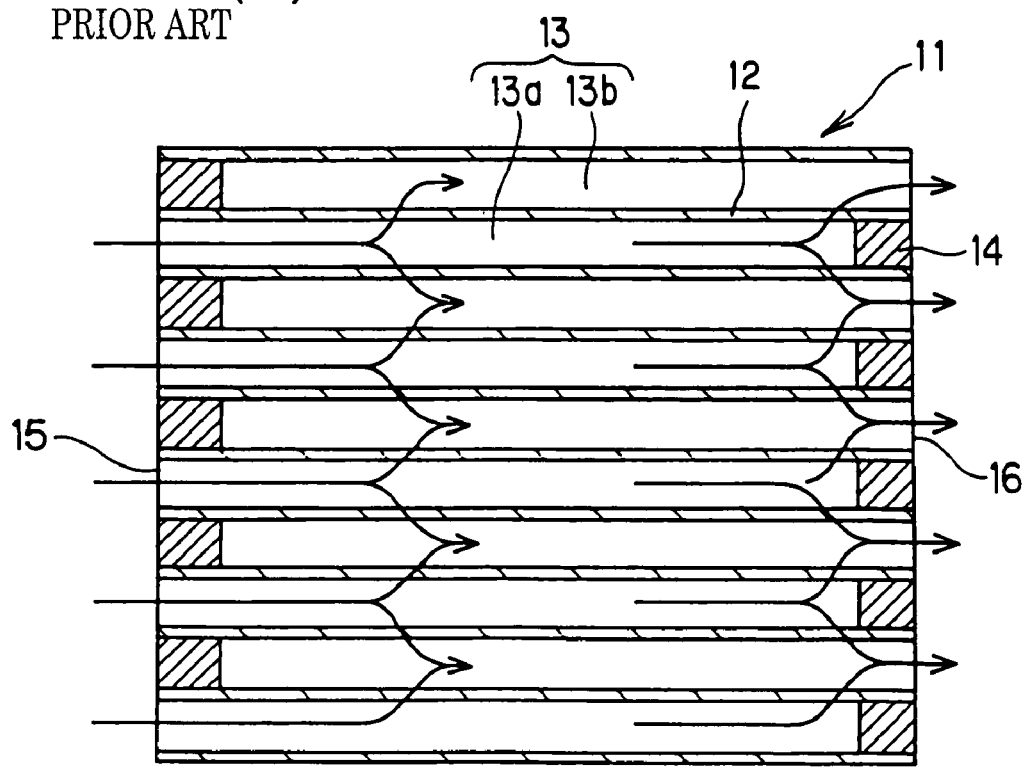

In the honeycomb filter used as a conventional DPF and the like, through channels 13 are plugged on the end faces of both sides of the honeycomb structure (the inlet port side end face 15 and the outlet port side end face 16 of the gas to be treated) as shown in FIG. 10, with all the through channels 13 being plugged at either one of the ends, whereas in the honeycomb filter 1 of the first invention, specified through channels 3a among numerous through channels are plugged only at its end face 6 (which functions as the end face for the outlet port side of the gas to be treated during use) at the same side out of two end faces of the honeycomb structure, as mentioned above.

Specifically, in the honeycomb filter of the first invention, the through channels 3a plugged at the one end face at the same side out of two end faces are present together with through channels 3b not plugged at any end face. In such a configuration, in the same manner as in a conventional honeycomb filter, the gas to be treated flowing into the through channels 3a, of which one end is plugged, passes through the porous partition walls 2 functioning as a filter layer and is discharged outside after removal of particulate matters in the gas. However, since the gas to be treated flowing into the through channels 3b not plugged at any end is discharged outside almost without passing through the partition walls 2, the efficiency of capturing the particulate matters as the whole filter would decrease relatively, as compared with a conventional honeycomb filter.

However, when there are the through channels 3b which are not plugged, the pressure loss can be reduced as compared with a conventional honeycomb filter. This type of the filter is useful in the application in which the capturing efficiency is not required so severely. In addition, since solids such as ash and iron oxide remaining in the unplugged through channels 3b without extinguishing after burning particulate matters deposited inside the filter are discharged outside by the pressure of the gas passing through the through channels 3b, clogging of the filter due to the solids hardly occurs.

Furthermore, when the exhaust gas from the engine greatly pulsates, the pulsation is received by all the through channels of which one end is plugged in a conventional honeycomb filter. Therefore, all particulate matters deposited in the through channels (including inside of pores of the partition walls partitioning the through channels) may be discharged at once from the rear portion of the filter by exhaust gas pulsation. However, if the honeycomb filter of the first invention is used, pulsation of exhaust gas can be adsorbed due to the presence of the unplugged through channels of which ventilation resistance is relatively small. Thus, the amount of particulate matters deposited in the through channels of which one end is plugged to be discharged towards the rear portion of the filter due to exhaust gas pulsation can be effectively suppressed.

The honeycomb filter of the present invention can be suitably used for the exhaust gas purification system in lean burn gasoline engines and direct-injection gasoline engines, as well as in diesel engines. In general, gasoline engines discharge exhaust gas at a higher temperature and with greater fluctuation, as compared with diesel engines. The exhaust gas temperature of a diesel engine is about 600° C. at most, whereas the exhaust gas temperature of a gasoline engine may reach 1000° C. or more in the neighborhood of the engine.

When a honeycomb filter is installed in an exhaust gas system, the exhaust gas inlet port of the filter will be directly affected by a temperature fluctuation of exhaust gas. Therefore, when an attention is paid to the exhaust gas temperature fluctuation from an engine, thermal shock resistance in the exhaust gas inlet port of the filter is important. In a conventional honeycomb filter as shown in FIG. 10, plugging portions 14 of through channels are provided alternately; the ones at the end face of the exhaust gas outlet port side 16, and the others at the end face of the exhaust gas outlet port side 15. This configuration has a problem in terms of thermal shock resistance and, therefore, it has been difficult to apply a conventional honeycomb filter to a gasoline engine in which both the temperature and the temperature fluctuation of the exhaust gas are high.

However, the honeycomb filter of the first invention has a configuration in which the plugging portions of through channels are provided only on the one end face at the same side out of two end faces, without plugging portions of through, channels on the other end face located at the opposite side. This honeycomb filter can resist severe thermal shock by an exhaust gas temperature fluctuation in the exhaust gas inlet port side, even if it is used for a gasoline engine, by installing it in such a manner that the end face of the side having no plugging portion is used as an end face of the exhaust gas inlet port side. Accordingly, the honeycomb filter of the first invention can be suitably used also in a diesel engine, even under the conditions that the temperature fluctuation of the exhaust gas is larger and the thermal shock is more severe.

Although the plugging portions 4 of the through channels are formed in a checkerwise pattern in FIG. 1, the configuration of the plugging portion is not limited to this pattern. For example, it is possible to provide a plurality of through channels plugged at one end face at the same side out of two end faces in a specific location and to provide a plurality of through channels not plugged at any end face in another specific location. Alternatively, through channels at one end face at the same side out of two end faces and through channels not plugged at any end face may be respectively arranged in line viewing from the end face side of the honeycomb structure.

In addition, it is also possible to arrange through channels plugged at one end face at the same side out of two end faces and through channels not plugged at any end face, respectively in the configuration of a concentric circle or in a radial pattern viewing from the end face side of the honeycomb structure. Moreover, it is possible to arrange through channels plugged at one end face at the same side out of two end faces and through channels not plugged at any end face alternately along the perimeter of a honeycomb structure, and to arrange further through channels not plugged at any end face inside the perimeter only (the central part of the honeycomb structure).

Various patterns are possible for the configuration of the plugging portions of these through channels according to the cross-sectional form (cell form) of the through channels. Although the cell form is a quadrangle in the examples shown in the accompanying figures, a polygon such as a triangle or a hexagon, a circle, or a combination of different cell forms are acceptable. There are no specific limitations also to the cross-sectional form of the honeycomb structure. In addition to a circle, any forms such as an ellipse, long circle, oval, approximate triangle, and approximate quadrangle are possible.

Figure 2A:
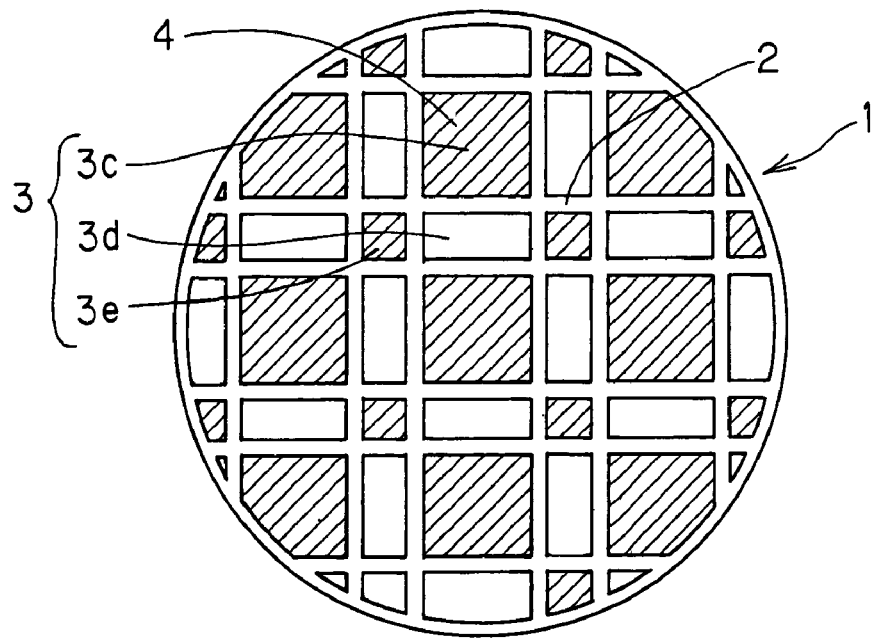
FIGS. 2(a) and (b) are an illustrative showing of another embodiment of the honeycomb structure of the first invention, wherein (a) is a plan view from one end face and (b) is a cross-sectional view.
Figure 2B:
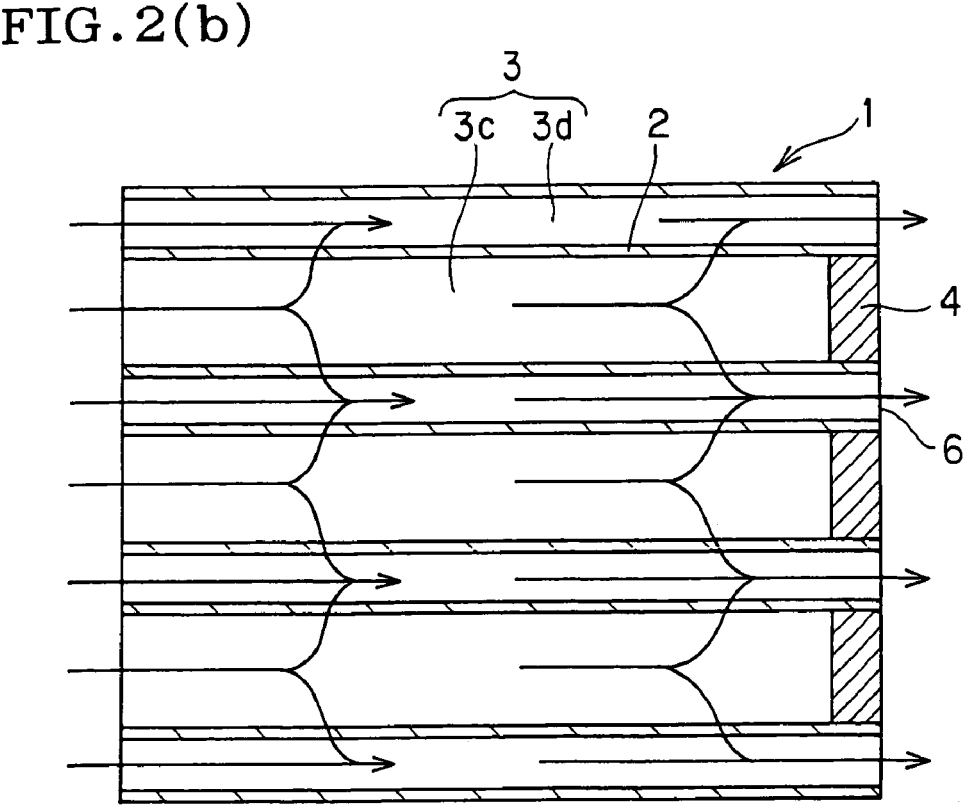

Moreover, the frontal area of the through channels needs not be the same in all through channels. It is possible to provide the through channels with different frontal areas. For example, in the embodiment shown in FIGS. 2(a) and 2(b), the honeycomb structure 1 has through channels 3c with a relatively large frontal area and through channels 3d with a relatively small frontal area. In this case, one may provide additionally plugged through channels 3e having the smallest frontal area and being defined by four partition walls of four adjacent through channels with relatively small frontal area. When the honeycomb structure having such a configuration is used as the honeycomb filter of the present invention, it is desirable to plug one end of the through channels 3c with a relatively large frontal area only on the end face 6 at the same side out of two end faces of the honeycomb structure 1.

When the frontal area of all through channels is the same as shown in FIG. 1, exhaust gas tends to flow into the through channels not plugged at any end face since they have a relatively small ventilation resistance. In such a case, the amount of exhaust gas flowing into the through channels plugged at the one end at the same side out of two end faces decreases, resulting in a significant decrease in capturing efficiency of the filter.

On the other hand, if both the through channels 3c with a relatively large frontal area and the through channels 3d with a relatively small frontal area are provided, with one end of the through channels 3c with a relatively large frontal area being plugged and the ends of the through channels 3d with a relatively small frontal area being unplugged; the exhaust gas flows more easily into the through channels 3c of which the end is plugged, whereby it is possible to avoid a large reduction in capturing efficiency of the filter.

In addition, it is possible to adjust ventilation resistance of through channels by filling the through channels not plugged at any end face with a foam or fibrous packing, forming projections in the shape of particles, fibers, fins, or the like, bending the partition walls, or curving the surface of the partition walls, whereby the capturing performance of particulate matters can increase.

From the viewpoint of strength, heat resistance, and the like, the material for the honeycomb structure is preferably a ceramic such as cordierite, alumina, mullite, aluminum titanate, titania, zirconia, silicon nitride, aluminum nitride, silicon carbide, or LAS (lithium aluminum silicate), a composite of two or more of these ceramics, a metal such as stainless steel or aluminum alloys, or an adsorbent such as activated carbon, silica gel, orzeolite. Moreover, the same material is preferably used for the plugging portion 4 which plugs the end of through channels and for the honeycomb structure to make the coefficient of thermal expansion the same.

Noble metals such as platinum (Pt), rhodium (Rh); and palladium (Pd) and non-noble metals such as copper, titania, vanadium, zeolite, and a perovskite-type catalyst may be carried on the surface of the partition walls and/or the surface of the pores inside the partition walls of the honeycomb structure to make it possible to treat hazardous components such as hydrocarbons (HC), carbon monoxide (CO), and nitrogen oxides (NOx) in exhaust gas or to accelerate burning of particulate matters deposited in the filter.

It was difficult to cause catalyst components to be carried on a conventionally-used typical honeycomb filter due to the configuration in which the ends of adjoining through channels are alternately plugged on the end faces of both sides of the honeycomb structure. On the other hand, it is relatively easy to cause the catalyst components to be carried on the honeycomb filter of the first invention due to the configuration in which the ends of a elected number of through channels are plugged among the numerous through channels at the one end face at the same side out of two end faces. The catalyst components can thus be carried almost uniformly over the entire filter.

As the catalyst component to be carried on the filter for exhaust gas purification, an oxidation catalyst having a function to process hydrocarbons, CO, and particulate matters such as Pt or Pd is used. A reduction catalyst such as Rh may also be carried to process NOx.

Since sulfur in the exhaust gas may also be oxidized by the oxidation catalyst and produces sulfuric acid and the like, the catalyst itself may be poisoned, resulting in a decrease in performance. The degree of poisoning by the oxidation catalyst is particularly significant in the reduction catalyst. Therefore, causing the oxidation catalyst and the reduction catalyst to be present together in the same region is not preferable. The reduction catalyst may be covered with particulate matters, or ash, physically obstructing NOx components from coming into contact with the catalyst. The reduction reaction may also be prevented if hydrocarbons are oxidized, since the hydrocarbons function also as a reducing agent.

Furthermore, if the oxidation catalyst, and the reduction catalyst are present together, dispersibility and independence of each catalyst component decrease, resulting in a decrease, in efficiency in coming in contact with the exhaust gas. Still another problem that can be anticipated is a rapid increase in temperature due to burning of particulate matters by the oxidation catalyst, which may result in deterioration of the reduction catalyst existing in the neighborhood.

Therefore, when the oxidation catalyst and the reduction catalyst are carried on the honeycomb filter of the first invention, the oxidation catalyst is carried on the inside-pore surface of the partition walls partitioning the through channels plugged at one end at the same side out of two end faces and/or on the surface of the pores inside the partition walls, and the reduction catalyst is carried on the inside-pore surface of the partition walls partitioning the other through channels not plugged at any end face and/or on the surface of the pores inside the partition walls, whereby the co-existence of the oxidation catalyst and reduction catalyst within the same region can be basically avoided.

In the inner surfaces of the through channels plugged at one end at the same side out of the two end surfaces on which the oxidation catalyst is carried, components such as hydrocarbons, CO, particulate matters, and sulfur are oxidized, but NOx components pass through the porous partition walls, without being reduced. Then, they flow into through channels not plugged at any end face. Since the reduction catalyst is carried on in through channels not plugged at any end face, independently from the oxidation catalyst, the NOx components passing through the partition walls of said through channels came into through channels not plugged at any end face, and they are joined with NOx components directly flowing into the through channels not plugged at any end face and thus jointed NOx components are reduced there by the reduction catalyst.

Since hydrocarbons are present without being oxidized in the through channel not plugged at any end face, the hydrocarbon scan function as a reducing agent. In addition, no sulfuric acid will be produced by oxidation of sulfur components in the through channel not plugged at any end face. Moreover, since exhaust gas passing through the through channel plugged at one end face at the same side out of the two end faces comes into the through channel not plugged at any end face, only a small amount of particulate matters accumulate on the partition wall surface of the through channel, whereby the particulate matters hardly cover the reduction catalyst and consequently the catalyst is seldom prevented from contacting NOx components.

Since NOx components are mainly generated in the course of burning at a high temperature, a large amount of the Nox components are produced in the high engine load and high engine rotation region. Both the amount and the flow rate of exhaust gas increase when the NOx components are produced. Under these conditions, since the exhaust gas tends to flow selectively into the through channel not plugged at any end face, where ventilation resistance is relatively low, it is effective to dispose the reduction catalyst in the through channel not plugged at any end face. If the exhaust gas is heated to a high temperature, particulate matters burn themselves.

Because the through channel plugged at one end face at the same side out of the two end faces and the through channel not plugged at any end face are separated only by one sheet of partition wall, the oxidation catalyst can be completely separated from the reduction catalyst if the catalyst components are carried only on the surface of the partition wall. However, if the catalyst components are carried on also inside the pores in the partition wall, the oxidation catalyst may be present together with the reduction catalyst inside the partition wall. Even if under such a condition, a honeycomb filter can be accepted if designed as a whole in such a manner that the oxidation catalyst is a major component in the through channel plugged at one end face at the same side out of the two end faces, the reduction catalyst increases toward the through channel not plugged at any end face, and the reduction catalyst becomes a major component in the through channel not plugged at any end face.

When two or more honeycomb filters are used as in the case of the exhaust gas purification system discussed later, it is unnecessary to provide the same material characteristics such as the material of construction for each honeycomb, cell density, wall thickness, cell structure such as cell form, porosity, pore size, and pore distribution. Any optional honeycomb filters can be selected according to the use conditions.

As a method for manufacturing the honeycomb filter of the first invention, a method comprising forming a honeycomb structure by extrusion or the like, filling a predetermined through channel at one end face out of the two end faces of the honeycomb structure with a ceramic material in the form of a slurry or paste to form the plugging portions, and firing the resultant having the plugging portions is simple. However, if firing is carried out using through channels being plugged only on one end face, a firing shrinkage difference is produced between the end face on which the through channels is plugged and the end face on which the through channels is unplugged. Defects in the products such as distortion, deforming, and cracks tend to generate due to imbalanced shrinkage.

To avoid such a firing shrinkage difference in the manufacture of the honeycomb filter of the first invention, it is preferable to form the plugging portions by filling the predetermined through channels not at either one end face, but at any end face of the honeycomb structure, fire the resultant in such a manner that the amount of shrinkage during firing may be approximately the same on both end faces, and removing one of the plugging portions of the through channels at a predetermined one end face out of the two end faces. Alternatively, the obtained honeycomb structure is cut on the center to produce two identical honeycomb filters.

To form a honeycomb filter with a configuration in which the oxidation catalyst is carried on the inside-pore surface of the partition walls partitioning the through channels plugged at one end face at the same side out of the two end faces and/or the surface of pores inside the partition walls, and the reduction catalyst is carried on the inside-pore surface of the partition walls partitioning the other through channels not plugged at the both end faces and/or the surface of pores inside the partition walls, for example, a common honeycomb filter of which predetermined through channels are alternately plugged at the end faces of both sides of the honeycomb structure is first produced. Then, a slurry containing an oxidation catalyst component is fed to open through channels from one end face of the filter to make the oxidation catalyst component to be carried in the through channels. Then, a slurry containing a reduction catalyst component is fed to open through channels from the other end face to cause the reduction catalyst component to be carried in the through channels. After that, the end face on the side from which the slurry containing the oxidation catalyst component was fed is cut and removed together with the plugging portions of the through channels.

The exhaust gas purification system of the second invention is characterized by using the above-mentioned honeycomb filter of the first invention. The use of the honeycomb filter not only reduces a pressure loss in the system, but also prevents filter clogging.

Figure 3:
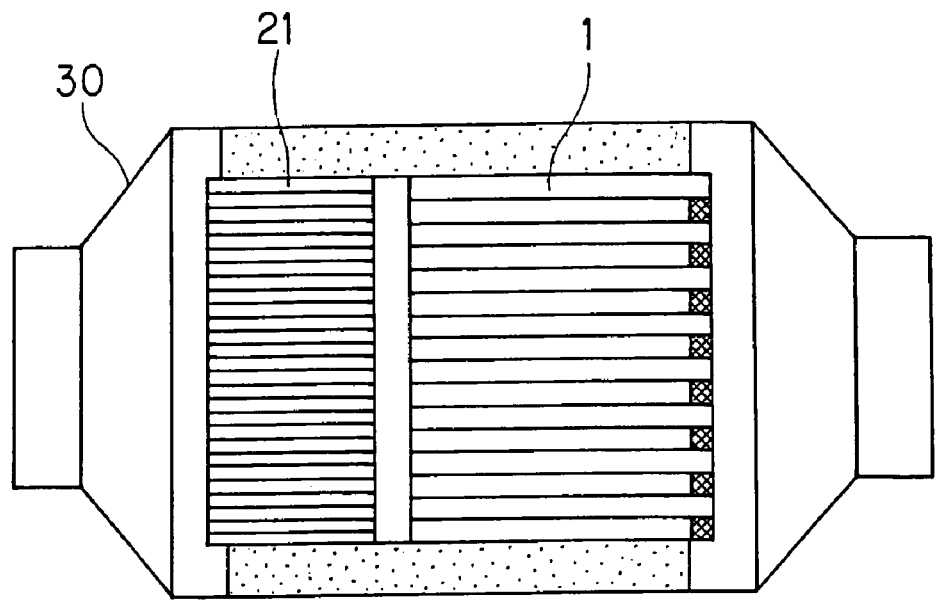
FIG. 3 is an illustrative showing of one embodiment of the emission gas purification system of the second invention.

The honeycomb filter of the first invention may be used in this system alone or two or more of the honeycomb filters may be used in combination according to use object. Other components may be used in combination. For example, as shown in FIG. 3, a system constructed in a canning case 30 in which a catalyst 21 comprising a honeycomb structure carrying catalyst components is placed in the front of the honeycomb filter 1 of the first invention (on the upstream side of exhaust gas flow) can convert harmful components such as hydrocarbons in exhaust gas into in noxious components, following which particulate matters are removed by the honeycomb filter 1 disposed on the rear end. As the catalyst component carried on the catalyst 21, metals conventionally used for purifying exhaust gas such as Pt, Pd, and Rh can be used, for example.

Figure 4:
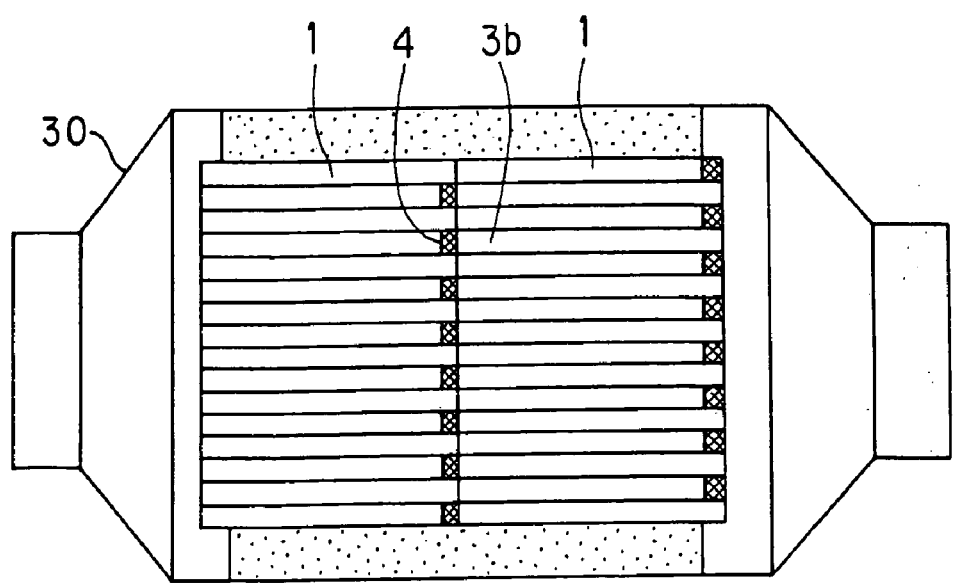
FIG. 4 is an illustrative showing of another embodiment of the emission gas purification system of the second invention.

In another system configuration, two honeycomb filters 1 of the first invention are installed in series in the direction of exhaust gas flow as shown in FIG. 4. In this instance, two honeycomb filters 1 are installed so that the plugging portions 4 of the through channels of the honeycomb filter 1 in the front end are located face by face with the end parts of the through channels 3b not plugged at any end face of the honeycomb filter 1 disposed in the rear end, with the facing end faces of the two honeycomb filters 1 being joined or in contact with each other. This configuration can increase capturing efficiency of particulate matters.

From the viewpoint of avoiding an excess thermal stress, a low thermal expansion material is preferably used on the adhesion surface when joining the two honeycomb filters. For example, when the honeycomb filter is manufactured with a low thermal expansion material such as cordierite, LAS is suitable as a joining material.

Figure 5:
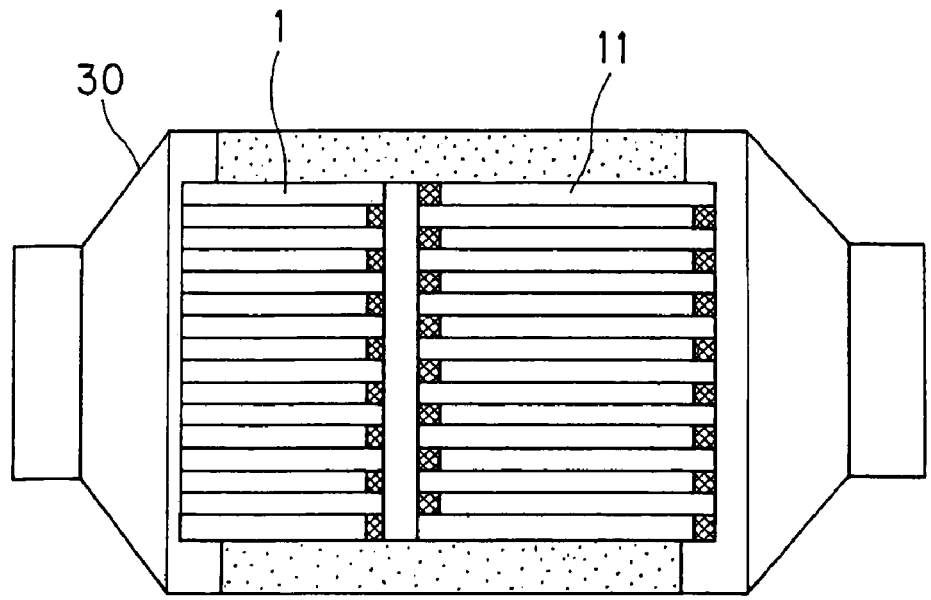
FIG. 5 is an illustrative showing of another embodiment of the emission gas purification system of the second invention.

In a honeycomb structure having a large number of through channels formed in the axial direction and partitioned by porous partition walls shown in FIG. 5, if a system configuration wherein a honeycomb filter 11 (honeycomb filter with a conventional configuration as shown in FIG. 10) of which one end of a part of the through channels is plugged on the end face of one side and one end of the remaining through channels is plugged on the other end face is installed behind the honeycomb filter 1 of the first invention (on the downstream side of exhaust gas flow direction) is adopted, particulate matters in the exhaust gas are previously removed to some extent by the honeycomb filter 1 of the first invention, and not much particulate matters accumulate in the honeycomb filter 11 installed at the rear end.

For this reason, it is possible to expand the interval of filter recovery (removal of particulate matters by burning) and to reduce a risk of filter clogging by decreasing the amount of solid matters such as ash remaining in the honeycomb filter installed at the rear end.

In addition, if required, it is possible not only to reduce ventilation resistance of the through channels having the plugging portions by causing exhaust gas to pass through a part of the plugging portions of the through channels, but also to reduce a risk of filter clogging by discharging solid matters such as ash captured in the through channels outside the filter through a through passage area. Instead of providing a through passage area in a part of the plugging portions, the same effect can be expected by providing all plugging portions with gas permeability.

As a means for causing exhaust gas to pass through a part of the plugging portions of the through channels, it is preferable to provide the plugging portions with through-holes or to provide a clearance in the boundary of the partition wall and the plugging portion. A means for providing all plugging portions with gas permeability is specifically to form the plugging portions from a porous material. Usually, since the plugging portion is thicker than the partition wall, it is preferable that the pore size of the plugging portion be larger than the pore size of the partition wall.

Figure 6:
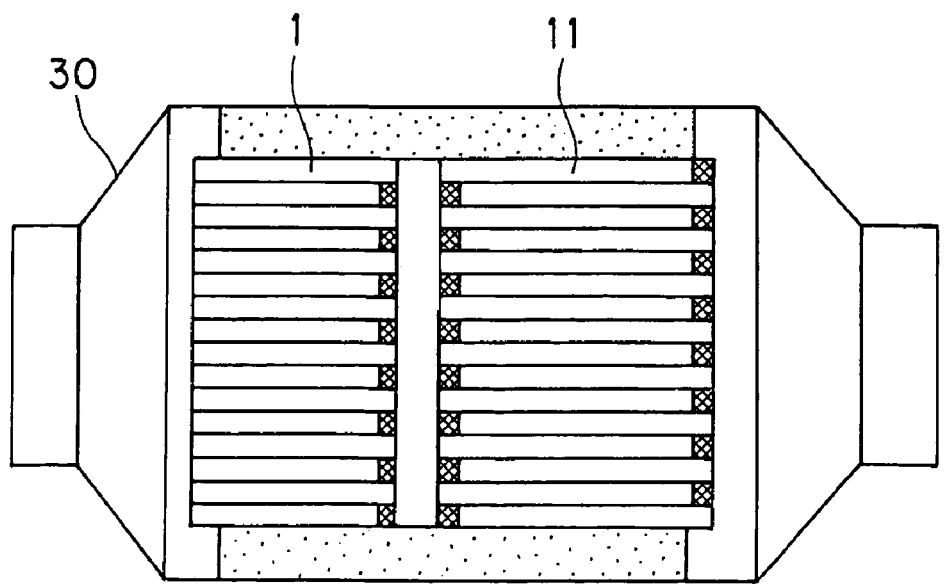
FIG. 6 is an illustrative showing of another embodiment of the emission gas purification system of the second invention.

When the honeycomb filter 11 with a conventional configuration is arranged behind the honeycomb filter 1 of the first invention in this manner, the plugging portions of the through channels of the honeycomb filter 11 with a conventional configuration are preferably disposed face by face with the plugging portions of through channels of the honeycomb filter 1 of the first invention on the end face on which the honeycomb filters 1 and 11 face each other (location in which the honeycomb filters face each other in the axial direction) as shown in FIG. 6. It is more preferable that the opposing end faces of the honeycomb filters 1 and 11 be in contact with each other or the honeycomb filters 1 and 11 are joined.

This configuration can solve the problem of adhesion of particulate matters to the plugging portions of the through channels on the end face on the exhaust gas inlet port side of the honeycomb filters, resulting in deposition of particulate matters around the adhered particulate matters as a core and clogging of openings of the through channels not plugged on the exhaust gas inlet port side, and eventually causing a rapid increase in the pressure loss in the filter.

Figure 7:
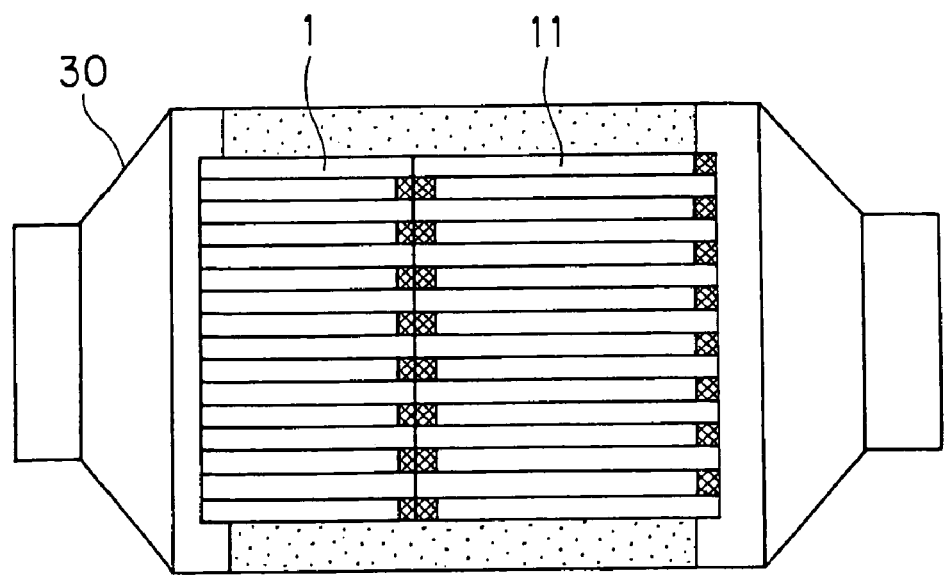
FIG. 7 is an illustrative showing of another embodiment of the emission gas purification system of the second invention.
Figure 8:
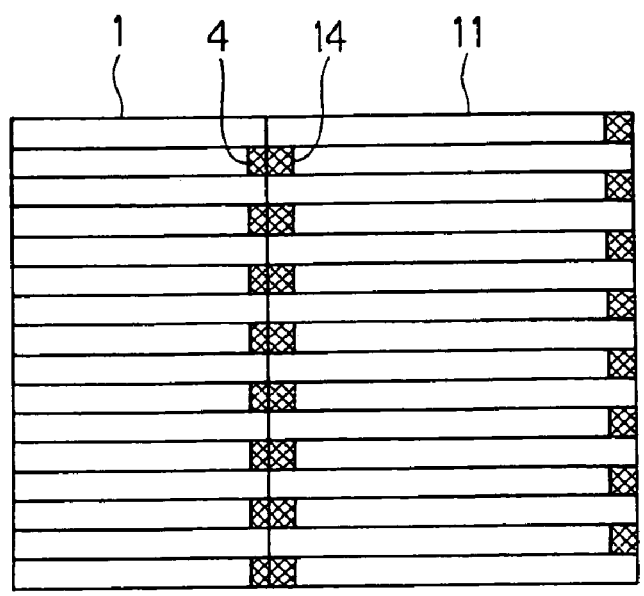
FIG. 8 is an illustrative showing of one embodiment of the honeycomb filter of the third invention.

The honeycomb filter of the third invention employs the honeycomb filter 1 of the first invention and the honeycomb filter 11 with a conventional configuration in combination as shown in FIG. 7, wherein the two filters are maintained in contact with each other by any means or integrated by joining to form one honeycomb filter with an objective of, for example, easy incorporation into a system. As shown in FIG. 8, the first honeycomb filter 1 comprising a honeycomb structure having a large number of through channels formed in the axial direction and partitioned by porous partition walls, wherein specified through channels are plugged at one end face at the same side out of two end faces (the honeycomb filter of the first invention) and a second honeycomb filter 11 comprising a honeycomb structure having a large number of through channels formed in the axial direction and partitioned by porous partition walls, wherein specified through channels are plugged at one end face at the same side out of the two end faces and the remaining through channels are plugged on the other end face (honeycomb filter with a conventional configuration as shown in FIG. 10) are in contact with each other or joined in the plugging portions 1 and 14 of the respective through channels.

To maintain the two honeycomb filters 1 and 11 in contact with each other or to integrate them by joining, a method of causing the partition walls of two filters to be in contact with each other or to join on the end face of the two filters is conceivable. However, in the case of a honeycomb structure with a thin wall as used for a filter, the area on the partition wall on the end face is small, specifically, only a small area is available for contact or joining. It is, therefore, difficult to secure a necessary contact area or obtain an adequate joining strength.

For this reason, the two filters 1 and 11 are caused to be in contact with each other or joined to become integrated in the plugging portions 4 and 14 of the respective through channels in the third invention, as described above. A sufficient area for contact or joining to provide necessary strength can be secured if the plugging portions 4 and 14 are disposed so that the respective plugging portions are in contact with each other when the two filters are joined at one end face of them. Effects such as easy incorporation into an exhaust gas purification system and smooth gas flow between both filters can be obtained by causing the two honeycomb filters to become in contact with each other or joining them to integrate in this manner.

The fourth invention provides one embodiment of a method for manufacturing the honeycomb filter of the third invention. The method comprises, in the case in which the plugging portions 4 and 14 of the through channels of the first honeycomb filter 1 and the second honeycomb filter 11 are formed by filling the end of the through channels with a ceramic material and firing the ceramic material, joining the unfired plugging portions (the ceramic material filled in the end of the through channels) of the first honeycomb filter 1 and the second honeycomb filter 11 each other prior to firing and thereafter integrating the two honeycomb filters by firing. If the plugging portions of the through channels of both honeycomb filters are joined before firing in this manner, the two honeycomb filters can be integrated during subsequent firing without using cement or the like.

Of course, a cement or the like may be used for joining the unfired plugging portions, whereby it is possible to integrate the two honeycomb filters more firmly. Moreover, in the case in which the thermal expansion characteristics of the two honeycomb filters differ due to the difference of the materials and the like, it is possible to secure reliability of the joint by devising the type of cement used so that the thermal expansion differences can be mitigated.

The fifth invention provides another embodiment of a method for manufacturing the honeycomb filter of the third invention. The method comprises, in the case in which the plugging portions 4 and 14 of the through channels of the first honeycomb filter 1 and the second honeycomb filter 11 are formed by filling the end of the through channels with a ceramic material and firing the ceramic material, joining the plugging portions of the first honeycomb filter 1 and the second honeycomb filter 11 each other using cement after firing and thereafter again firing to integrate the two honeycomb filters. According to this method, when there are the first honeycomb filter 1 and the second honeycomb filter 11 each having the plugging portions already fired, it is possible to integrate the two honeycomb filters easily and with a sufficient joining force. When a catalyst component is carried on the filters, the catalyst component may be carried on either before or after joining the two honeycomb filters.

Figure 9:
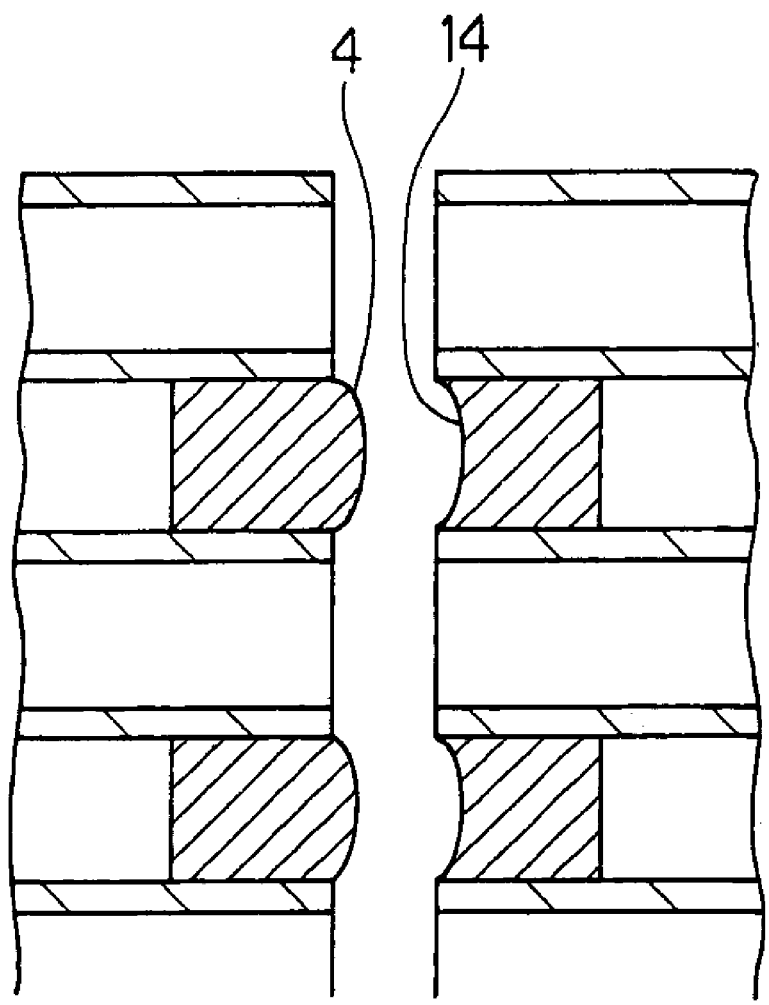
FIG. 9 is an illustrative showing of the joining planes of plugging portions with convex, and concave configurations.

In this manufacturing method, it is preferable to make the joining surface in the plugging portions 4 of either the first honeycomb filter 1 or the second honeycomb filter 11 convex and the joining surface of the other plugging portions 14 concave as shown in FIG. 9, whereby the joining, position of the two honeycomb filters can be easily determined and the joining force can increase. The joining position of the two honeycomb filters can also be easily determined by providing the plugging portions of either the first honeycomb filter or the second honeycomb filter with a pin and providing the other honeycomb filter with a hole that can engage the pin in the plugging portions.

As described above, as compared with a conventional technology, it is possible to reduce a pressure loss and to decrease to a great extent the clogging of the filter with solid matters being incapable of dissipating by burning such as ash and iron oxide by using the honeycomb filter and the exhaust gas purification system of the present invention.

In addition, when exhaust gas from an engine greatly pulsates in the honeycomb filter of the present invention, the exhaust gas pulsation can be adsorbed by any unplugged through channels of which ventilation resistance is relatively small, whereby it is possible to control discharge of particulate matters deposited in the through channels plugged at the one end face out of the two end faces to the back of the filter due to exhaust gas pulsation.

Furthermore, the honeycomb filter of the present invention can be used as an exhaust gas purification filter for gasoline engines of which the exhaust gas temperature is higher than that of diesel engines and fluctuates within a fluctuation range wider than that of diesel engines.

Moreover, if a honeycomb filter with a conventional configuration is installed behind the honeycomb filter of the present invention (on downstream side in the exhaust gas flow direction), the resulting system can solve the problem of adhesion of particulate matters to the plugging portions of the through channels on the end face on the exhaust gas inlet port side of the honeycomb filters, resulting in deposition of particulate matters around the adhered particulate matters as a core and clogging of openings of the through channels not plugged at the end faces on the exhaust gas inlet port side, and eventually causing a rapid increase in the pressure loss in the filter.

What is claimed is:

1. An exhaust gas purification system comprising a first honeycomb filter comprising a honeycomb structure having a large number of through channels formed in the axial direction and partitioned by porous partition walls, each of the through channels having a first end at one end of the filter and a second end at an opposite end of the filter, wherein a first group of the through channels have a relatively large open area of cell in a cross-section parallel to the end face and are plugged only at the first end, and a second group of the through channels have a relatively small open area of cell in the end face cross-section and are not plugged, wherein there is further installed behind said first honeycomb filter a second honeycomb filter comprising a honeycomb structure having a large number of through channels formed in the axial direction and partitioned by porous partition walls; a first group of the through channels of the second honeycomb filter being plugged only at a first end and a second group of the through channels of the second honeycomb filter being plugged only at a second end, and the cross-sectional areas of the through channels are substantially uniform in the axial direction.

2. The exhaust gas purification system according to claim 1, wherein the honeycomb filters are disposed, facing each other so as to make them contact or joined at plugged portions of their respective end faces.

3. The exhaust gas purification system according to claim 2, wherein the plugged portions of the first honeycomb filter have protruding concave end portions and the plugged portions of the second honeycomb filter have convex end portions, such that the concave and convex end portions mate smoothly when the honecomb filters are placed in contact.

* * * * *